United States Patent
Burgers et al.

(10) Patent No.: US 9,923,788 B2
(45) Date of Patent: Mar. 20, 2018

(54) METHOD OF SELECTING A COMPOSITE SERVICE FROM A PLURALITY OF COMPOSITE SERVICES

(75) Inventors: Robby Gerard Bernhard Burgers, Eindhoven (NL); Frederik Hugo Zwaal, Breda (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 13/996,236

(22) PCT Filed: Dec. 20, 2010

(86) PCT No.: PCT/EP2010/070316
§ 371 (c)(1),
(2), (4) Date: Jun. 20, 2013

(87) PCT Pub. No.: WO2012/084008
PCT Pub. Date: Jun. 28, 2012

(65) Prior Publication Data
US 2013/0311657 A1 Nov. 21, 2013

(51) Int. Cl.
| | |
|---|---|
| *G06F 15/173* | (2006.01) |
| *G06F 15/16* | (2006.01) |
| *H04L 12/26* | (2006.01) |
| *H04M 3/42* | (2006.01) |
| *H04L 29/06* | (2006.01) |
| *H04Q 3/00* | (2006.01) |

(52) U.S. Cl.
CPC .......... *H04L 43/08* (2013.01); *H04L 65/1016* (2013.01); *H04L 65/1096* (2013.01); *H04M 3/4217* (2013.01); *H04Q 3/0054* (2013.01); *H04M 2201/10* (2013.01)

(58) Field of Classification Search
CPC ...................... G06F 17/3053; G06F 17/30867
USPC ......................... 709/224, 226, 219
See application file for complete search history.

(56) References Cited

U.S. PATENT DOCUMENTS

| | | | | |
|---|---|---|---|---|
| 5,642,410 A | * | 6/1997 | Walsh .................. | H04M 1/663 379/128 |
| 5,655,015 A | * | 8/1997 | Walsh .................. | H04M 1/247 379/142.06 |
| 5,727,950 A | * | 3/1998 | Cook ...................... | G09B 5/02 434/350 |

(Continued)

OTHER PUBLICATIONS

Written Opinion of the International Searching Authority dated Sep. 9, 2011.

*Primary Examiner* — Madhu Woolcock
(74) *Attorney, Agent, or Firm* — Baker Botts, LLP (57) ABSTRACT

Method, for use in a telecommunications network, of selecting from a plurality of composite services a composite service to be executed in response to a network event. Each composite service has associated therewith criteria including a Boolean expression determining whether or not the composite service may be executed in response to the network event. The method comprises composing, for the network event, for each composite service an indicator indicating a) whether or not the criteria for that composite service are met by the network event, and b) a measure of conformity of the network event with said criteria. The method further includes selecting the composite service having associated therewith the indicator indicating that the criteria are met, and indicating closest conformity.

15 Claims, 5 Drawing Sheets

(56) References Cited

U.S. PATENT DOCUMENTS

| | | | | |
|---|---|---|---|---|
| 6,651,096 B1* | 11/2003 | Gai | ............ | H04L 63/101 709/223 |
| 6,721,795 B1* | 4/2004 | Eldreth | ............ | G06Q 30/02 370/469 |
| 2003/0023450 A1* | 1/2003 | Casati | ............ | G06Q 30/02 717/136 |
| 2005/0063417 A1* | 3/2005 | Berranger | ............ | G06F 9/5027 370/465 |
| 2005/0096960 A1* | 5/2005 | Plutowski | ............ | G06F 17/30905 705/7.29 |
| 2005/0172027 A1* | 8/2005 | Castellanos | ............ | H04L 41/5003 709/229 |
| 2005/0256947 A1* | 11/2005 | Devarakonda | ............ | H04L 41/0893 709/223 |
| 2006/0155852 A1* | 7/2006 | Mayer | ............ | G06F 17/30867 709/227 |
| 2007/0180061 A1* | 8/2007 | Bantz | ............ | G06Q 10/00 709/219 |
| 2008/0190272 A1* | 8/2008 | Taub | ............ | G10H 1/0058 84/645 |
| 2008/0209400 A1* | 8/2008 | Parker | ............ | G06F 8/71 717/122 |
| 2008/0270374 A1* | 10/2008 | Li | ............ | G06F 17/30495 |
| 2008/0281957 A1* | 11/2008 | Ladd | ............ | G06F 9/542 709/224 |
| 2008/0306798 A1* | 12/2008 | Anke | ............ | G06F 8/61 705/7.26 |
| 2009/0126020 A1* | 5/2009 | Norton | ............ | G06N 5/025 726/23 |
| 2009/0232047 A1* | 9/2009 | Lynch, Jr. | ............ | H04W 84/22 370/328 |
| 2009/0313055 A1* | 12/2009 | Martin | ............ | G06Q 10/02 705/6 |
| 2010/0299367 A1 | 11/2010 | Chakrabarti et al. | | |

* cited by examiner

METHOD OF SELECTING A COMPOSITE SERVICE FROM A PLURALITY OF COMPOSITE SERVICES

This application is the U.S. national phase of International Application No. PCT/EP2010/070316 filed 20 Dec. 2010 which designated the U.S., the entire contents of which is hereby incorporated by reference.

TECHNICAL FIELD

The invention relates to a method of selecting a composite service from a plurality of composite services. The invention also relates to a network node for selecting a composite service from a plurality of composite services. The invention also relates to a computer program product arranged for, when run on a programmable apparatus, selecting a composite service from a plurality of composite services.

BACKGROUND

In a telecom network it is customary to have value added services that can be executed on certain occasions. Typically, these services are triggered by a network event, e.g. a subscriber calling another subscriber or a specific service number.

It is known to provide the ability to combine many different services into composite services, sometimes referred to as "skeletons". On a network event, one of these composite services needs to be selected, using a selection procedure, and executed. This selection is normally based on data available in the service invocation request, such as destination address. The selection can also be based on provisioning data.

Each composite service may be associated with criteria, such as a priority or a specific execution sequence, that define the applicability of the composite service to a particular network event. For each network event, the criteria of each composite service are evaluated, indicating whether the composite service is applicable.

It can occur that the selection procedure results in multiple applicable composite services, from which a single composite service needs to be selected for execution. A known selection procedure is based on using pre-defined priorities to select the composite service to be executed. This mechanism exhibits two problems:

It still can result in more than one composite service being selected, unless each composite service is given a different, unique priority.

The priority mechanism is static and does not take into account that the nature of criteria for different composite services may differ.

SUMMARY

It is an object to obviate at least some of the above disadvantages and provide an improved method, for use in a telecommunications network, of selecting from a plurality of composite services a composite service to be executed in response to a network event, and having a reduced chance of multiple composite services being applicable or be able to select a composite service best matching the network event.

Thereto, a method is provided, for use in a telecommunications network, of selecting from a plurality of composite services a composite service to be executed in response to a network event, each composite service having associated therewith criteria determining whether or not the composite service may be executed in reaction to the network event, said criteria including a Boolean expression indicating the applicability of said composite service for said network event, the Boolean expression including one or more conditions and one or more Boolean operators, the method comprising composing, for the network event, for each composite service an indicator indicating whether or not the Boolean expression for that composite service is met by the network event, and a measure of conformity of the network event with said Boolean expression; and selecting the composite service having associated therewith the indicator indicating that the Boolean expression is met, and indicating closest conformity.

Hence, the method not only determines whether or not a composite service fulfils the criteria for allowing that composite service to be executed in response to the network event. Also, the method determines a measure of conformity of the network event with the criteria that determine whether or not the composite service may be executed in response to the network event. Hence, the method allows selecting the composite service giving closest conformity to the criteria. This closest conformity is determined based on the actual network event. Thus, there is no need to predetermine a priority for each composite service for each possible network event.

Since the criteria associated with each composite service include a Boolean expression indicating the availability of said composite service for said network event, the measure of conformity of the network event with the Boolean expression may be determined.

Instead of just evaluating which of the Boolean expressions result in a Boolean TRUE value, the method allows to select the Boolean expression that matches the network event, e.g. the service invocation request, strongest. Since the Boolean expressions may be constructed using Boolean operators, such as AND, OR and NOT, but also may contain comparison constructs (like "equal", "unequal", "greater than", "smaller than", etc.), each of the Boolean conditions can be evaluated individually.

It will be appreciated that the Boolean expression may represent the criteria determining whether or not the composite service may be executed in response to the network event. The Boolean expression may be a logical representation of said criteria.

In an embodiment, the indicator comprises a score tuple including the elements:

a Boolean result (R) of the Boolean expression for the network event, and one or more of a number (S) of conditions of the Boolean expression satisfied by the network event, a number (C) of conditions contributing to a positive result of the Boolean expression, and a number (N) of conditions in the Boolean expression.

A score tuple a list of scores. Herein score tuples are written by listing the elements within parentheses '( )' and separated by commas. In the examples, the elements R, S, C and N are combined into a score tuple (R, S, C, N). The value for such score tuple, can for instance be (true, 2, 3, 4), indicating that R=true, S=2, C=3, and N=4.

Thus, according to an aspect of the invention a score tuple is assigned to the Boolean expression representing the criteria. Thereto, may be assigned an individual score tuple to each condition of the Boolean expression, providing an indication of how strong the condition matches the input data represented by the network event. The score tuple of the Boolean expression may then be calculated from the individual score tuples of the respective conditions. The score tuple of the Boolean expression may be used to determine the measure of conformity of the respective composite services with the network event.

In an embodiment, the tuple score of the Boolean expression may be calsulated from the individual score tuples of the individual conditions. Herein, the number N of conditions in the Boolean expression may be calculated as the sum of the individual conditions' $N_i$ (i=1, 2, 3, ... ). The number S of conditions of the Boolean expression satisfied by the network event, and the number C of conditions contributing to a positive result of the Boolean expression may be calculated as follows depending on the type of Boolean operator.

For a logical-OR operator, the number S of conditions satisfied in the Boolean expression is the sum of individual conditions' $S_i$ satisfied. The number C of conditions contributing to the positive result of the Boolean expression is the number of individual conditions' $C_i$ contributing in the branches contributing most to the positive result of the Boolean expression, because OR weakens the expression.

For a logical-AND operator, the number S of conditions satisfied in the Boolean expression is the sum of the individual conditions' $S_i$ satisfied in the branches of the Boolean expression. The number C of conditions contributing to the positive result of the Boolean expression is the sum of the individual contributing conditions' $C_i$ in the branches, because AND strengthens the expression.

For a logical-NOT operator, the number S of conditions satisfied in the Boolean expression is the difference between the number of individual conditions' $N_i$ and the number of individual conditions' $S_i$ satisfied in the branch of the Boolean expression, and the number C of conditions contributing to the positive result of the Boolean expression is the difference between the number of individual conditions' $N_i$ and the number of individual contributing conditions' $C_i$ in the branch of the Boolean expression, because NOT inverts the expression.

The composite service having the highest measure of conformity of all composite services may be selected to be executed in response to the network event. For instance, the composite service having associated therewith the score tuple with a highest score, according to a predetermined evaluation scheme, may be selected to be executed in response to the network event.

In an embodiment, the composite service having the highest measure of conformity of all composite services is defined as the composite service having
  a positive Boolean result (R), and
  a highest ratio (S/N) of satisfied conditions,
  a highest number (S) of satisfied conditions, and/or
  a highest number (C) of contributing conditions.

Thus, the measure of conformity of the network event with the criteria may be determined on the basis of the ratio (S/N) of conditions of the Boolean expression representing the criteria met by the network event, on the basis of the number (S) of conditions of the Boolean expression representing the criteria met by the network event, and/or the number (C) of conditions of the Boolean expression contributing to the positive result of the determination that the network event meet the Boolean expression.

In an embodiment, the composite service having the highest measure of conformity of all composite services is defined as the composite service having a positive Boolean result (R), and a highest ratio (S/N) of satisfied conditions. If multiple candidate composite services remain, having an identical ratio (S/N) of satisfied conditions, the composite service having the highest measure of conformity of all composite services may be defined as the composite service having a highest number (S) of satisfied conditions. If multiple candidate composite services remain, having an identical number (S) of satisfied conditions, the composite service having the highest measure of conformity of all composite services may be defined as the composite service having a highest number (C) of contributing conditions.

Alternatively, one could favour a higher number (S) of satisfied conditions over the ratio (S/N) of satisfied conditions. This can be based on the same score tuple, by redefining the order of precedence.

It will be appreciated that many different orders of precedence are possible, all based on the same scoring mechanism.

In an embodiment, if multiple candidate composite services remain, the composite service having the highest measure of conformity may subsequently be determined based on a predetermined highest priority. Thus, for the rare cases where still multiple candidates remain, a predetermined, e.g. static, priority may be awarded to each composite service.

Optionally, the network event is a service invocation request, and the indicator provides a measure of conformity of the criteria with the service invocation request.

In an embodiment, for each composite service a weight is associated with one or more of the conditions of the Boolean expression. Said weight can be taken into account in determining the measure of conformity. For instance, it is possible to determine a weighed total number $(S_w)$ of satisfied conditions, by adding the respective weights of the conditions that have been satisfied. It is also possible to determine a weighed total number $(C_w)$ of contributing conditions, a weighed total number of conditions $(N_w)$ in the expression and/or a weighed ratio $(S_w/N_w)$ of satisfied conditions.

In an embodiment, the telecommunications network is an Internet Protocol Multimedia Subsystem (IMS) network. Thus, the method as described above may be used in an IMS network for selecting from a plurality of composite IMS services a composite IMS service to be executed in response to a network event, such as an IMS service invocation request. The telecommunications network may also be a Service Oriented Architecture (SOA) or a Signalling System #7 (SS7) network.

The invention also relates to a network entity arranged for performing the method according to the invention. Said network entity is arranged for performing one or more of the features of the method as described above.

Such network entity may be Network entity, for use in a telecommunications network, for selecting from a plurality of composite services a composite service to be executed in response to a network event, such as a service invocation request, said network entity having a memory associated therewith, said memory including, for each composite service, a Boolean expression determining whether or not the composite service may be executed in response to the network event, the Boolean expression including one or more conditions and one or more Boolean operators, said network entity including a receiving unit for receiving the network event, a determination unit arranged for determining for each composite service whether or not the Boolean expression for that composite service is met by the network event, an evaluation unit arranged for determining a measure of conformity of the network event with the Boolean expression, and a selection unit arranged for selecting the composite service for which the determination unit determined that the Boolean expression is met, and for which the evaluation unit indicated closest conformity.

In an embodiment, the determination unit is arranged for determining a Boolean result (R) of the Boolean expression for the network event, and the evaluation unit is arranged for determining one or more of a number (S) of conditions of the Boolean expression satisfied by the network event, a number (C) of conditions contributing to a positive result of the Boolean expression, and a number (N) of conditions in the Boolean expression.

In an embodiment, the determination unit is arranged for determining the highest measure of conformity on the basis of a highest ratio (S/N) of satisfied conditions, a highest number (S) of satisfied conditions, and/or a highest number (C) of contributing conditions, e.g. in that order of precedence.

In an embodiment, the network entity is arranged for use in an Internet Protocol (IP) Multimedia Subsystem (IMS) network, the network entity for instance being an Application Server (AS) or a Serving Call Session Control function (S-CSCF).

The invention also relates to a computer program product including software code portions arranged for performing, when run on a programmable apparatus, the steps of the method according to the invention. Preferably, the computer program product is is arranged for performing one or more of the optional features of the method as described above.

In an embodiment, the computer program product is included on a data carrier, such as a solid memory, an optical storage medium, such as a CD-ROM, DVD or Blu-Ray disk, a magnetic storage medium, such as hard-disk or tape, or a carrier wave such as provided via the internet or an intranet.

It will be appreciated that using a measure of conformity to select an applicable composite service provides a much more accurate selection than other techniques (such as priorities). Moreover, the measure of conformity, especially the score tuple, actually identifies which expression matches the input strongest. It also provides a score that conforms to one's intuition of what matches best.

BRIEF DESCRIPTION OF THE DRAWINGS

The invention will now be further elucidated by means of non-limiting examples referring to the drawings, in which.

DETAILED DESCRIPTION

Figure 1:
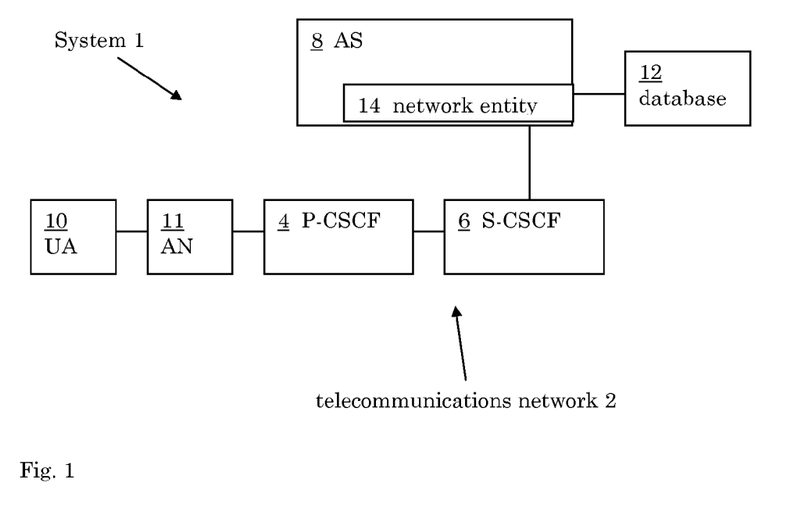
FIG. 1 is a schematic representation of telecommunication network.

FIG. 1 shows a schematic representation of a system 1 according to the invention. The system 1 includes a telecommunications network 2, in this example an Internet Protocol (IP) Multimedia Subsystem (IMS) network, known per se. In this example, the telecommunications network 2 includes a Proxy Call Session Control Function (P-CSCF) 4 and a Serving Call Session Control Function (S-CSCF) 6. The network 2 includes an Application Server (AS) 8 arranged for providing one or more network services. In this example, the AS 8 is arranged for providing a plurality of mutually different network services. The different services may be combined into composite services (sometimes also referred to as skeletons). Many mutually different composite services are possible by providing different combinations of the mutually different network services.

In the example of FIG. 1 the system 1 comprises a User Agent (UA) 10. The UA 10 may be embodied by a User Equipment (UE), such as a cellular phone, a modem, a computer, a personal digital assistant (PDA) or the like. Here, the User Agent 10 accesses the communications network 2 via an Access Network (AN) 11.

One of the composite services may be provided if a certain network event occurs. Such network event may e.g. be a subscriber associated with the UA 10 calling another subscriber or a specific network number. The network event may thus invoke the composite service. In general, the network event may thus be a service invocation request.

Since a plurality of different composite services is available in this example, one of these composite services needs to be selected and executed in response to said network event. In the example, each composite service has associated therewith criteria determining whether or not the composite service may be executed in response to the network event. These criteria may be stored in a database 12 associated with the AS 8.

Figure 8:
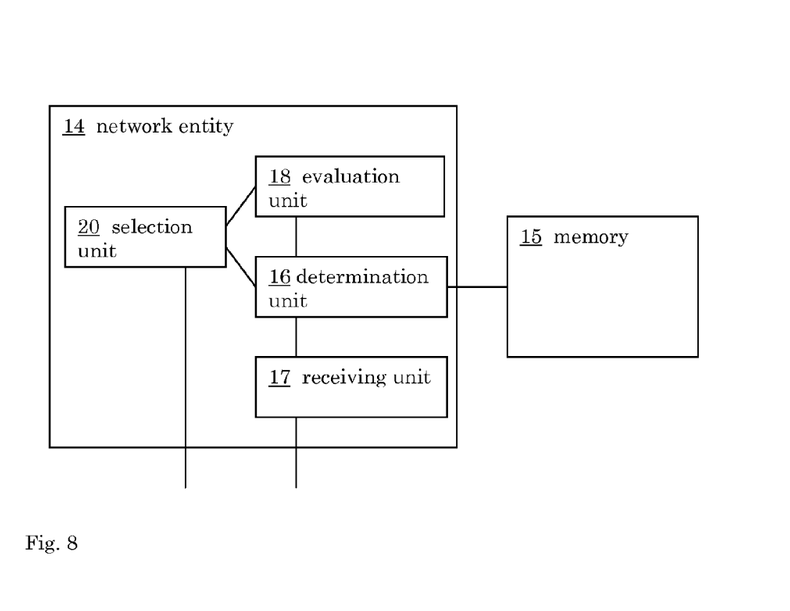
FIG. 8 shows a schematic representation of an exemplary embodiment of a network entity according to the invention.

Selection of the composite service may be performed by a network entity 14. In this example, the network entity is included in the AS 8. FIG. 8 shows a schematic representation of an exemplary embodiment of the network entity 14.

The network entity 14, for use in the telecommunications network 2, has a memory 15 associated therewith. Said memory includes, for each composite service, criteria determining whether or not the composite service may be executed in response to the network event. In this example, the memory 15 may be formed by the database 12. The network entity 14 includes a receiving unit 17 for receiving the network event. The network entity 14 includes a determination unit 16 arranged for determining for each composite service whether or not the criteria for that composite service are met by the network event. The network entity 14 includes an evaluation unit 18 arranged for determining a measure of conformity of the network event with said criteria. The network entity 14 includes a selection unit 20 arranged for selecting the composite service for which the determination unit 16 determined that the criteria are met, and for which the evaluation unit 18 indicated closest conformity.

It will be appreciated that the determination unit 16, the evaluation unit 18, and selection unit 20 can be embodied as dedicated electronic circuits, possibly including software code portions. The determination unit 16, the evaluation unit 18, and selection unit 20 may also be embodied as software code portions executed on a programmable apparatus such as a server in the communications network.

According to the invention, for the network event, for each composite service of the plurality of composite services an indicator is composed. The indicator indicates whether or not the criteria for that composite service are met by the network event. If the indicator indicates that the criteria are not met for the network event for a particular composite service, that composite service is refused. The indicator also indicates a measure of conformity of the network event with said criteria. The composite service having associated therewith the indicator indicating that the criteria are met, and indicating closest conformity is selected to be executed in response to said network event.

In the following examples, for each of the composite services, the criteria associated therewith are represented as a Boolean expression. The Boolean expression indicates the applicability of said composite service for said network event. The Boolean expression includes one or more conditions which may or may not be met by the network event. The Boolean expression may also include one or more Boolean operators such as AND, OR, or NOT. The Boolean expression may also include comparison constructs, such as "equal", "unequal", "greater than", "smaller than", and the like.

Instead of just evaluating which of the Boolean expressions result in a Boolean TRUE value, the present invention aims to select the Boolean expression that matches the network event strongest. Since the Boolean expressions are constructed using Boolean operators, and may also contain comparison constructs, each of the Boolean conditions can be evaluated individually.

In the examples, score tuples are assigned to each condition providing an indication how strong that condition matches the input data in the network event, e.g. in the service invocation request. The score tuple of the Boolean expression is then calculated from the individual score tuples of the conditions in that Boolean expression. The score tuple of the Boolean expression may be used as the indicator mentioned above. The score tuple of the Boolean expression may, therefore, be used to choose between available composite services.

The determination unit 16 may be arranged for determining for each composite service whether a Boolean expression indicating the applicability of said composite service for said network event has been met. The evaluation unit 18 may be arranged for determining a measure of conformity of the network event with the Boolean expression. The selection unit 20 may be arranged for selecting the composite service for which the determination unit 16 determined that the Boolean expression is met, and for which the evaluation unit 18 indicated closest conformity.

The score tuple of the Boolean expression may include the elements:

a Boolean result (R) of the Boolean expression for the network event, and one or more of a number (S) of conditions of the Boolean expression satisfied by the network event, a number (C) of conditions contributing to a positive result of the Boolean expression, and a number (N) of conditions in the Boolean expression.

The Boolean expression may be expressed as a comparison tree, wherein each node may contain a sub-tree. Each node in said comparison tree may be assigned a score tuple containing four elements:

a Boolean result ($R_i$) (i=1, 2, 3, . . . ) of the expression in the sub-tree, and one or more of a number ($S_i$) of conditions satisfied in the sub-tree, a number ($C_i$) of conditions contributing to a positive result of the sub-tree, and a number ($N_i$) of conditions in the subtree.

A node having no sub-tree will be termed "leaf".
In the examples, the score tuple of the Boolean expression includes all four elements R, S, C and N. In the examples the score tuple of a sub-tree includes all four elements $R_i$, $S_i$, $C_i$ and $N_i$. If, in the examples, for a leaf the condition evaluates to TRUE, the score tuple of the leaf ($R_i$, $S_i$, $C_i$, $N_i$)=(true, 1, 1, 1). The Boolean result ($R_i$) is "true". Since it concerns one non-dividable condition, the number of satisfied conditions ($S_i$) is one, the number of contributing conditions ($C_i$) is one, and the total number of conditions ($N_i$) is one. If, in the examples, for a leaf the condition evaluates to FALSE, the score tuple of the leaf ($R_i$, $S_i$, $C_i$, $N_i$)=(false, 0, 0, 1). The Boolean result ($R_i$) is "false". Since it concerns one non-dividable condition, the number of satisfied conditions ($S_i$) is zero, the number of contributing conditions ($C_i$) is zero, and the total number of conditions ($N_i$) is one.

Figure 2A:
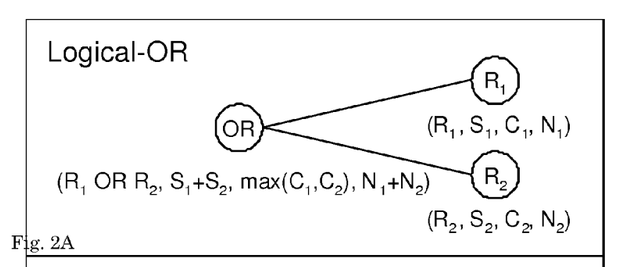
FIGS. 2A-2C are examples of rules on how the score tuple of a node is calculated based on the score tuples in the sub-tree(s) and/or leave(s)
Figures 2B, 2C:
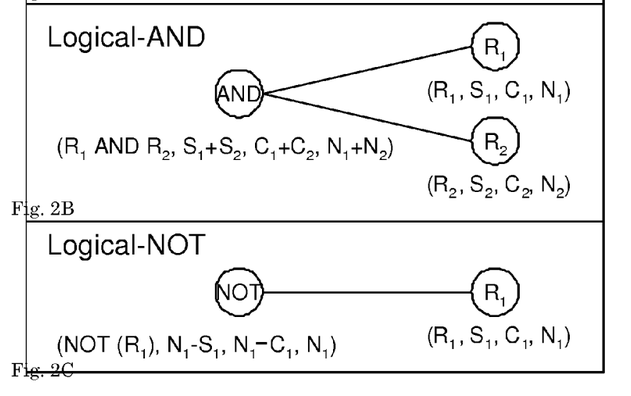

In each node the score tuple is calculated based on the score tuples of the leaves of the node. FIGS. 2A-2C show examples of rules on how the score tuple of a node may be calculated based on the score tuples in the sub-tree(s) and/or leave(s).

In the examples of FIGS. 2A-2C, the $N_i$ value of a node is always calculated as the sum of $N_i$ values of the leaves, or braches, of that node. The $S_i$ and $C_i$ value are in these examples calculated depending on the type of operation:

Logical-OR: $S_i$ is the sum of the branches' $S_i$ values. $C_i$ is the maximum of the branches' $C_i$ values, because OR weakens the expression;

Logical-AND: $S_i$ is the sum of the branches' $S_i$ values. $C_i$ is the sum of the branches' $C_i$ values, because AND strengthens the expression; and Logical-NOT: $S_i$ and $C_i$ are the difference between the branch's $N_i$ value and $S_i$ and $C_i$ values respectively, because NOT inverts the expression.

The score tuple of the examples provides several parameters, e.g. the ratio S/N, the number S, and the number C, which in a combination thereof, or taken per se, give an indication of the measure of conformity of the Boolean expression with the input parameter(s) in the network event.

Figure 3:
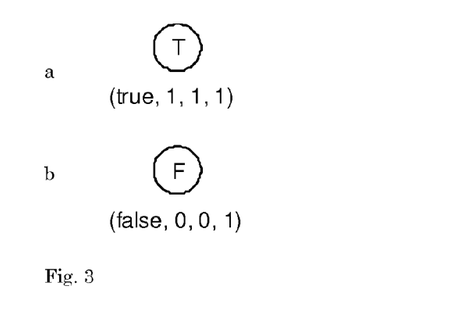
FIG. 3 shows a first example of a selection between Boolean expressions.

In the example of FIG. 3, the Boolean result of the expression is evaluated. In the example of FIG. 3 the first expression (a) evaluates to TRUE and the second expression (b) evaluates to FALSE. The score tuple (R, S, C, N) of the first expression (a) is then (true, 1, 1, 1). The score tuple (R, S, C, N) of the second expression (b) is then (false, 0, 0, 1). It will be appreciated that in such case, the composite service associated with the expression (a) evaluating to TRUE is to be selected to be executed.

Figure 4:
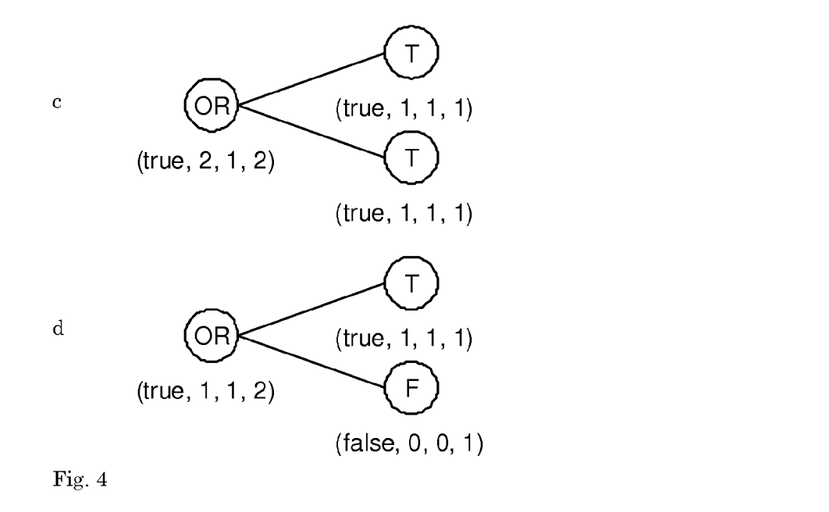
FIG. 4 shows a second example of a selection between Boolean expressions.

In the example of FIG. 4 both expressions (c) and (d) evaluate to TRUE. Therefore, both composite services associated with the expressions (c) and (d), respectively, are applicable to the network event, and a selection must be made. In this example, the first expression (c) contains the Boolean operator OR applied to two leaves both evaluating to TRUE. In this example, the second expression (d) contains the Boolean operator OR applied to two leaves one evaluating to TRUE, the other to FALSE. Applying the rules as described with respect to FIGS. 2A-2C, the score tuple (R, S, C, N) of the first expression (c) is (true, 2, 1, 2). Applying the rules as described with respect to FIGS. 2A-2C, the score tuple (R, S, C, N) of the second expression (d) is (true, 1, 1, 2). In this example, the first expression (c) has the highest ratio of satisfied conditions in the expression, calculated as S/N. Therefore, based on the highest ratio S/N the composite service associated with the first expression (c) may be selected to be executed.

Figure 5:
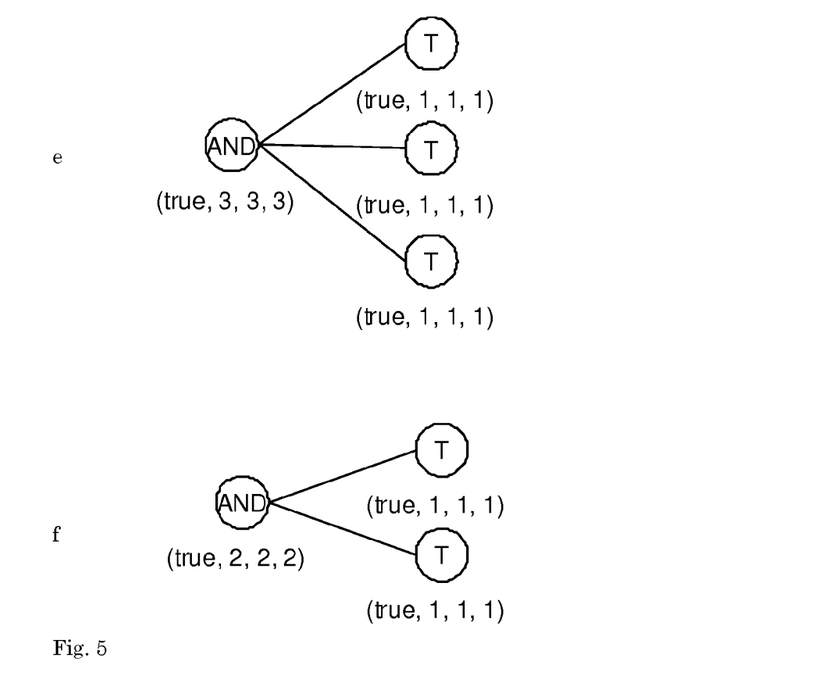
FIG. 5 shows a third example of a selection between Boolean expressions.

In the example of FIG. 5 both expressions (e) and (f) evaluate to TRUE. Therefore, both composite services associated with the expressions (e) and (f), respectively, are applicable to the network event, and a selection must be made. In this example, the first expression (e) contains the Boolean operator AND applied to three leaves all evaluating to TRUE. In this example, the second expression (f) contains the Boolean operator AND applied to two leaves both evaluating to TRUE. Applying the rules as described with respect to FIGS. 2A-2C, the score tuple (R, S, C, N) of the first expression (e) is (true, 3, 3, 3). Applying the rules as described with respect to FIGS. 2A-2C, the score tuple (R, S, C, N) of the second expression (f) is (true, 2, 2, 2).

In the example of FIG. 5, both expressions (e) and (f) have an equal ration (S/N) of satisfied conditions. Therefore, the selection has to be made on a parameter different from S/N. The first expression (e) has the highest amount of satisfied conditions (S). Therefore, based on the highest number S of conditions satisfied, the composite service associated with the first expression (e) may be selected to be executed.

Figure 6:
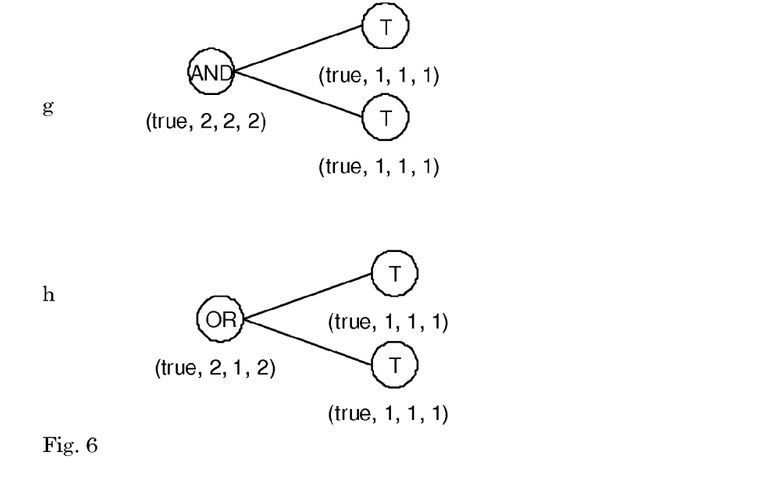
FIG. 6 shows a fourth example of a selection between Boolean expressions.

In the example of FIG. 6 both expressions (g) and (h) evaluate to TRUE. Therefore, both composite services associated with the expressions (g) and (h), respectively, are applicable to the network event, and a selection must be made. In this example, the first expression (g) contains the Boolean operator AND applied to two leaves both evaluating to TRUE. In this example, the second expression (h) contains the Boolean operator OR applied to two leaves both evaluating to TRUE. Applying the rules as described with respect to FIGS. 2A-2C, the score tuple (R, S, C, N) of the first expression (g) is (true, 2, 2, 2). Applying the rules as described with respect to FIGS. 2A-2C, the score tuple (R, S, C, N) of the second expression (h) is (true, 2, 1, 2).

In the example of FIG. 6, both expressions (g) and (h) have an equal ratio S/N of satisfied conditions, as well as an equals amount S of satisfied conditions. Therefore, the selection has to be made on a parameter different from S/N and S. The first expression (g) has the highest number of contributing conditions (C). Therefore, based on the highest number C of contributing conditions, the composite service associated with the first expression (g) may be selected to be executed.

In the above examples, the measure of conformity of the criteria, here the Boolean expression, with the network event is determined on the basis of the ratio of satisfied conditions S/N, the number of satisfied conditions S, and the number of contributing conditions C. It will be appreciated that alternatively, or additionally, the measure of conformity may be determined on the basis of e.g. the ratio C/N of contributing conditions, and/or the number N of conditions in the expression.

In the examples, the proposed tuple score follows De Morgan's laws which are known per se. These can for instance be shown in the two examples shown in FIG. 7

Figure 7:
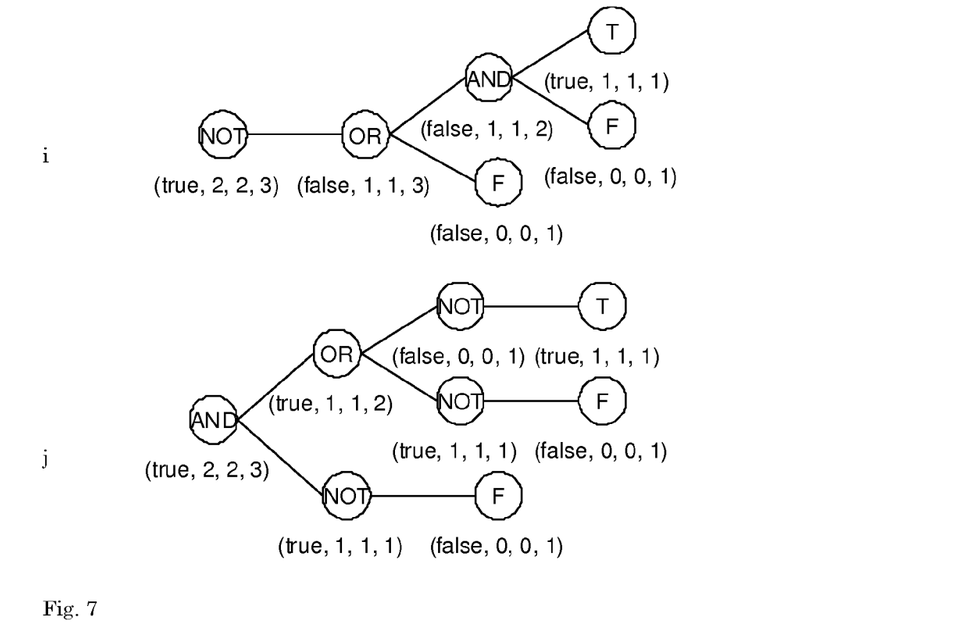
FIG. 7 shows an example of applicability of De Morgan's law.

Example (i): NOT ((a AND b) OR c)=((NOT a) OR (NOT b)) AND (NOT c) with a=true; b=false; c=false.

Example (j): NOT ((a AND b) OR c)=((NOT a) OR (NOT b)) AND (NOT c) with a=false; b=false; c=false.

EXAMPLE 1

In the following example, based on Signaling System No. 7 (SS7), the following two expressions for two skeletons (composite services) A and B, with equal priorities, are defined:

A: $(operation)='InitialDP'
B: ($(operation)='InitialDP') AND ($(service_key)= '5050')

Without using the selection procedure according to the invention, for each service invocation request that is an InitialDP, the skeleton A would be selected, regardless of the service key value. However, if the service key equals 5050, skeleton B is the desired selection result.

According to the invention, the following tuple scores would be calculated for the service invocation request being an InitialDP and having a service key equalling 5050:

A: (true, 1, 1, 1)
B: (true, 2, 2, 2)

According the present invention, the above scores result in the selection of skeleton B, in case the selection is made on the basis of the ratio S/N of satisfied conditions, the number of satisfied conditions S, or the number of contributing conditions C. Also if this order of precedence is taken, skeleton B would be selected.

EXAMPLE 2

In the following, more elaborate, example, the following expressions for skeletons C, D and E are defined:

C: ($(operation)='INVITE') AND (($(to)='Bob') OR ($(to)='Alice'))

D: ($(operation)='INVITE') AND ($(to)='Bob')

E: ($(operation)='INVITE') AND ($(to)='Bob') AND (NOT ($(from)='Alice'))

Suppose a service invocation request is received, indicating an INVITE from Carol to Bob, then the above expressions result in the following tuple scores:

C: (true, 2, 2, 3)
D: (true, 2, 2, 2)
E: (true, 3, 3, 3)

Now, the tuple scores are evaluated using the order of precedence of first S/N, then S, and then C. It will be appreciated that the expression associated with skeleton C has a ratio S/N of satisfied conditions of about 0.67, while the expressions associated with skeletons D and E have a ratio S/N of 1. Since, further, the expression associated with skeleton E has a higher number S of satisfied conditions than the expression associated with skeleton D, the skeleton E will be selected. Of the three, the expression E is also the most constraining expression to satisfy, since it has the highest number C of conditions contributing to a positive result of the expression.

Now suppose that another service invocation request is received, indicating an INVITE from Alice to Bob. In this case the expressions evaluate to the following tuple scores:

C: (true, 2, 2, 3)
D: (true, 2, 2, 2)
E: (false, 2, 2, 3)

If the tuple scores are evaluated using the order of precedence of first S/N, then S, and then C, the above tuple scores result in the selection of skeleton D (S/N=1), which is now the strongest match.

Now suppose that another service invocation request is received, indicating an INVITE from Carol to Alice. In this case the expressions evaluate to the following tuple scores:

C: (true, 2, 2, 3)
D: (false, 1, 1, 2)
E: (false, 2, 2, 3)

The above tuple scores result in the selection of skeleton C, which evaluates to TRUE.

In general, to further enhance the distinguishing power of the selection method according to an aspect of the invention, each condition could be assigned a weight. The weight can be used in determining the measure of conformity. The weight is preferably only assigned to the leaves of an expression. Hence, a TRUE condition yields the tuple ($R_w$, $S_w$, $C_w$, $N_w$)=(true, weight, weight, weight) and a FALSE condition yields the tuple (false, 0, 0, weight). The calculations for Boolean operators AND, OR and NOT are as described with respect to FIGS. 2A-2C.

It will be appreciated that assigning a weight of 1 to each condition in the expression results in the calculations as described with respect to FIG. 3 to FIG. 7.

Using score tuples, according to an aspect of the invention, select an expression provides a much more accurate selection than other techniques (such as priorities). Moreover, the score tuples actually identify which expression matches the input data, in the network event, strongest.

In the foregoing specification, the invention has been described with reference to specific examples of embodiments of the invention. It will, however, be evident that various modifications and changes may be made therein without departing from the broader spirit and scope of the invention as set forth in the appended claims.

In the examples the system is shown as comprising one Application Server 8. It will be appreciated that it is also possible that the system comprises a plurality of application servers. In that case, the composite services may include services from one or more application server of the plurality of application servers. It is also possible that the system includes a plurality of databases storing the criteria associated with the composite services.

In the examples, the measure of conformity of the criteria, here the Boolean expression, with the network event is determined on the basis of the parameters ratio of satisfied conditions S/N, the number of satisfied conditions S, and the number of contributing conditions C, consecutively. It will be appreciated that the order of precedence of these parameters may also be modified.

In the examples, the measure of conformity of the criteria, here the Boolean expression, with the network event is determined on the basis of the ratio of satisfied conditions S/N, the number of satisfied conditions S, and the number of contributing conditions C. It will be appreciated that alternatively, or additionally, the measure of conformity may be determined on the basis of e.g. the ratio C/N of contributing conditions, and/or the number N of conditions in the expression.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

It will be appreciated that using a measure of conformity to select an applicable composite service provides a much more accurate selection than other techniques (such as priorities). Moreover, the measure of conformity, especially the score tuple, actually identifies which expression matches the input strongest. It also provides a score that conforms to one's intuition of what matches best.

The invention claimed is:

1. Method, for use in a telecommunications network, of selecting from a plurality of composite services a composite service to be executed in response to a request to open a communication connection,
    each of the plurality of composite services comprising a plurality of mutually different network services and having associated therewith criteria determining whether or not that composite service may be executed in reaction to the request, for each composite service said criteria associated therewith including a Boolean expression indicating applicability of that composite service for said request, the Boolean expression including one or more conditions and one or more Boolean operators,
    the method comprising:
        in response to receiving the request to open the communication connection, composing, by an application server of the telecommunications network, for each of the plurality of composite services an indicator indicating:
            whether or not the Boolean expression for that composite service is met by the request to open the communication connection; and
            a measure of conformity of the request to open the communication connection with that composite service; and
        selecting, by the application server of the telecommunications network, a composite service of the plurality of composite services, the selected composite service having associated therewith an indicator indicating that the Boolean expression for the selected composite service is met and the measure of conformity for the selected composite service comprises a highest ratio (S/N) of satisfied conditions of the plurality of composite services, the highest ratio is a ratio between a number of satisfied conditions of the Boolean expression of the selected service (S) to a number of conditions of the Boolean expression of the selected service(N); and
        executing, by the application server of the telecommunications network, the selected composite service to open the communication connection.

2. Method according to claim 1, wherein for each of the plurality of composite services the indicator comprises a score tuple including the elements:
    a Boolean result of the Boolean expression for the request to open the communication connection and that composite service, and one or more of:
        a number of conditions of the Boolean expression for the request to open the communication connection and that composite service satisfied by the request to open the communication connection;
        a number of conditions contributing to a positive result of the Boolean expression for the request to open the communication connection and that composite service; and
        a number of conditions in the Boolean expression for the request to open the communication connection and that composite service.

3. Method according to claim 2, wherein the selected composite service is associated with a composed indicator comprising a score tuple that includes:
    a positive Boolean result (R); and at least one of:
    a number of satisfied conditions higher than a number of satisfied conditions of any other composite service of the plurality of composite services; and
    a number (C) of contributing conditions higher than a number of contributing conditions of any other composite service of the plurality of composite services.

4. Method according to claim 3, wherein the measure of conformity for the selected composite service is determined by evaluating R, S/N, S, and C in that order if present.

5. Method according to claim 3, wherein, if the plurality of composite services comprises multiple composite services that are each associated with an indicator indicating that the Boolean expression for that composite service is met and the measure of conformity for that composite service is higher than or equal to a measure of conformity for any other composite service of the plurality of composite services, the selected composite service is determined based on a predetermined highest priority.

6. Method according to claim 1, wherein the request to open the communication connection is a service invocation request, and the indicator of the selected composite service provides a measure of conformity of the Boolean expression of the selected composite service with the service invocation request.

7. Method according to claim 1, wherein for each of the plurality of composite services, a weight is associated with the one or more conditions of the Boolean expression for that composite service, the measure of conformity being determined taking into account said weight.

8. Method according to claim 1, wherein the telecommunications network is an Internet Protocol Multimedia Subsystem network.

9. Network entity, for use in a telecommunications network, for selecting from a plurality of composite services a composite service to be executed in response to a received request to open a communication connection, said network entity comprising a memory, each of the plurality of composite services comprising a plurality of mutually different network services, said memory including, for each of the plurality of composite services, a Boolean expression determining whether or not that composite service may be executed in response to the request to open the communication connection, the Boolean expression for that composite service including one or more conditions and one or more Boolean operators, the network entity comprising electronic circuits configured to:
  receive the request to open the communication connection;
  determine for each of the plurality of composite services whether or not the Boolean expression for that composite service is met by the request to open the communication connection;
  determine for each of the plurality of composite services a measure of conformity of the request to open the communication connection with the Boolean expression for that composite service;
  select a composite service of the plurality of composite services for which the Boolean expression for the selected composite service is met, and for which the measure of conformity for the selected composite service comprises a highest ratio (S/N) of satisfied conditions of the plurality of composite services, the highest ratio is a ratio of a number of satisfied conditions of the Boolean expression of the selected service (S) to a number of conditions in the Boolean expression of the selected service (N); and
  execute the selected composite service to respond to the request to open the communication connection.

10. Network entity according to claim 9, wherein the electronic circuits are further configured to determine a Boolean result of the Boolean expression for each composite service of the plurality of composite services for the request to open the communication connection, and
  wherein the network entity is arranged for determining one or more of:
    a number of conditions of the Boolean expression for each of the plurality of composite services satisfied by the request to open the communication connection;
    a number of conditions contributing to a positive result of the Boolean expression for each of the plurality of composite services; and
    a number of conditions in the Boolean expression for each of the plurality of composite services;
  and for determining the measure of conformity for the selected composite service on the basis of one or more of:
    a highest number of satisfied conditions, and
    a highest number (C) of contributing conditions.

11. Network entity according to claim 9, wherein the electronic circuits are further configured to select, if the plurality of composite services comprises multiple composite services that are each associated with an indicator indicating that the Boolean expression for that composite service is met and the measure of conformity for that composite service is higher than or equal to a measure of conformity for any other composite service of the plurality of composite services, the selected composite service is determined based on a predetermined highest priority.

12. Network entity according to claim 9, wherein the memory includes a weight for each condition for each Boolean expression for each of the plurality of composite services, and wherein the electronic circuits are further configured to determine the measure of conformity for each of the plurality of composite services taking into account said weight.

13. Network entity according to claim 9, arranged for use in an Internet Protocol Multimedia Subsystem (IMS) network, the network entity being an Application Server (AS) or a Serving Call Session Control function (S-CSCF).

14. A non-transitory computer readable medium comprising logic, the logic configured to, when executed by an application server of a telecommunications network, cause the application server to perform operations comprising:
  receiving a request to open a communication connection;
  retrieving for each one of a plurality of composite services, criteria determining whether or not that composite service may be executed in reaction to the request to open the communication connection, for each composite service said criteria associated therewith including a Boolean expression indicating applicability of that composite service for said request to open the communication connection, the Boolean expression including one or more conditions and one or more Boolean operators, each of the plurality of composite services comprising a plurality of mutually different network services;
  evaluating for each composite service of the plurality of composite services an indicator indicating:
    whether or not the Boolean expression for that composite service is met by the request to open the communication connection; and
    a measure of conformity of the request to open the communication connection with the Boolean expression for that composite service;
  selecting a composite service of the plurality of composite services having associated therewith the indicator indicating that the Boolean expression for the selected composite service is met and the measure of conformity for the selected composite service comprises a highest ratio (S/N) of satisfied conditions of the plurality of composite services, the highest ratio is a ratio of a number of satisfied conditions of the Boolean expression of the selected service (S) to a number of conditions in the Boolean expression of the selected service (N); and executing the selected composite service in reaction to the request to open the communication connection.

15. The non-transitory computer readable medium comprising logic according to claim 14,
wherein for each of the plurality of composite services, the indicator for that composite service comprises a score tuple including the elements:
  a Boolean result of the Boolean expression for the request to open the communication connection for that composite service, and one or more of:
    a number of conditions of the Boolean expression for that composite service satisfied by the request to open the communication connection,
    a number of conditions contributing to a positive result of the Boolean expression for that composite service, and
    a number of conditions in the Boolean expression for that composite service;
wherein the selected composite service with a measure of conformity higher than or equal to a measure of conformity for any other composite service of the plurality of composite services is defined as the composite service having a positive Boolean result (R), and one or more of:
  a highest number of satisfied conditions, and
  a highest number (C) of contributing conditions.

* * * * *